June 22, 1965  
L. R. MacCLINTOCK  
3,190,060  
APPARATUS FOR CUTTING AND CONDITIONING  
HAY OR LIKE CROPS  
Filed Oct. 30, 1961  
2 Sheets-Sheet 1

INVENTOR  
Larry R. MacClintock

BY

ATTORNEYS

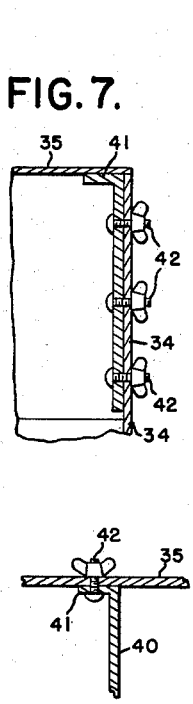
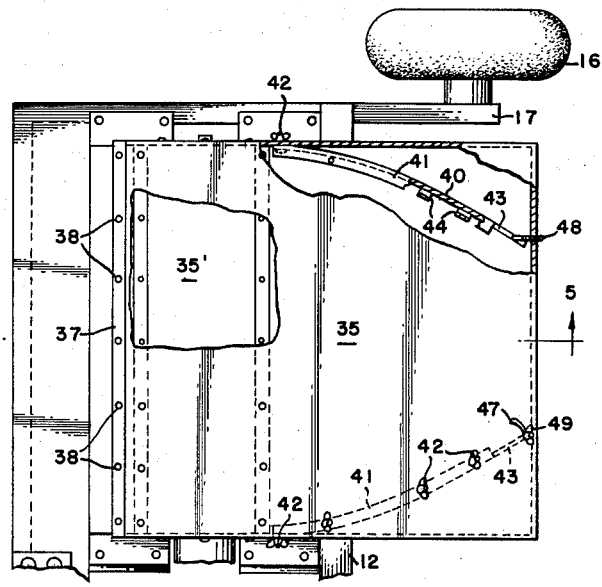
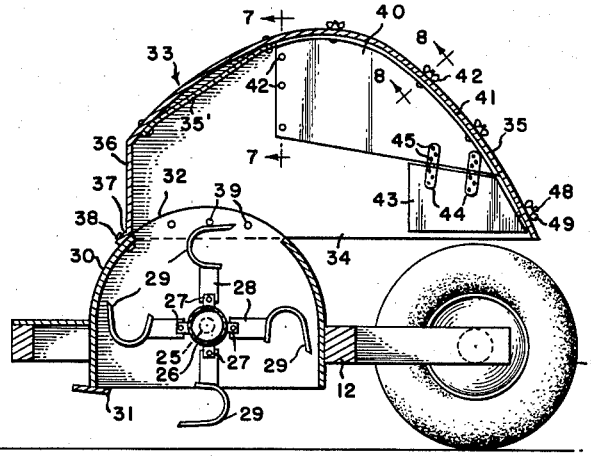
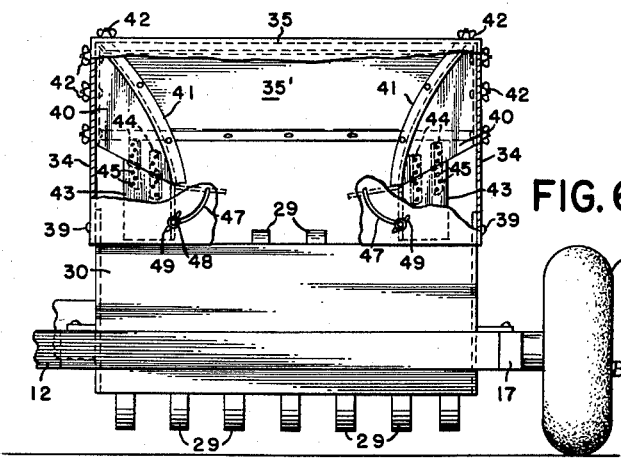

United States Patent Office 3,190,060
Patented June 22, 1965

3,190,060
APPARATUS FOR CUTTING AND CONDITIONING HAY OR LIKE CROPS
Larry R. MacClintock, East Meredith, N.Y.
Filed Oct. 30, 1961, Ser. No. 148,653
5 Claims. (Cl. 56—24)

This invention relates to an apparatus for cutting and conditioning hay or like crops.

In the gathering of hay or like crops, flail choppers of the type illustrated in Patents Nos. 2,864,223 dated December 16, 1958 and 2,880,561 dated April 7, 1959 have been conventionally employed. With these machines, the hay is cut and expelled under force upwardly and rearwardly through a chute, after which it falls to the ground for drying. Due to high liquid content, the hay must very often be left on the ground for an extended period of time to dry. This leaves the hay exposed to the elements, frequently with resultant further delays in storage.

It is an object of this invention to cut and in the same operation, condition hay, or like crops, by expressing liquid therefrom, thereby expediting drying.

Another object is to provide apparatus for conditioning hay or the like immediately after cutting, by catapulting the hay against an interceptor to express liquid therefrom, preparatory to depositing the conditioned hay on the ground where drying is consummated in a short time.

A further object is to provide apparatus for cutting and conditioning hay or the like, including a flail chopper and a hood over the flail chopper for effecting an increased vacuum at the locus of the crop being cut and air turbulence within the hood, the crop being drawn into the hood by the vacuum and thrown with force against the top of the hood to express liquid therefrom, pursuant to which the liquid evaporates under the turbulent air conditions within the hood.

A still further object is to provide a hood of the character described with the addition of baffles for windrowing the cut crop, portions thereof being adjustable to form windrows of any desired width.

Other objects of the invention will be manifest from the following description of the present form of the invention, taken in connection with the accompanying drawings, in which:

FIG. 4 is an enlarged fragmentary plan view of the present assembly, a portion thereof being broken away to disclose baffles forming a part of the present invention;

FIG. 5 is a sectional view taken along the line 5—5 of FIG. 4 looking in the direction of the arrows and showing to advantage the details of the cutting unit and hood unit;

FIG. 6 is a front elevational view of the present assembly, a portion of the hood being broken away to disclose details;

FIG. 7 is a sectional view taken along the line 7—7 of FIG. 5 looking in the direction of the arrows;

FIG. 8 is a sectional view taken along the line 8—8 of FIG. 5 looking in the direction of the arrows; and FIG. 9 is an edge elevational view of the baffle unit of the present invention illustrating the manner of connection of the swinging baffle to the stationary baffle, a portion thereof being broken away to disclose details.

In general, the assembly of the present invention comprises a flail chopper, designed to create a more powerful vacuum than has heretofore been possible, which vacuum effects lifting of the crop from the ground subsequent to cutting with such force that it is thrown upwardly against the assembly hood and strikes it with such impact that liquid is expressed from the crop. The crop is then channeled rearwardly by the hood during which time the extracted liquid is evaporated by air turbulence in the hood. The crop then falls to the ground where the sun and atmosphere complete the drying cycle in a minimum of time.

Figure 1:
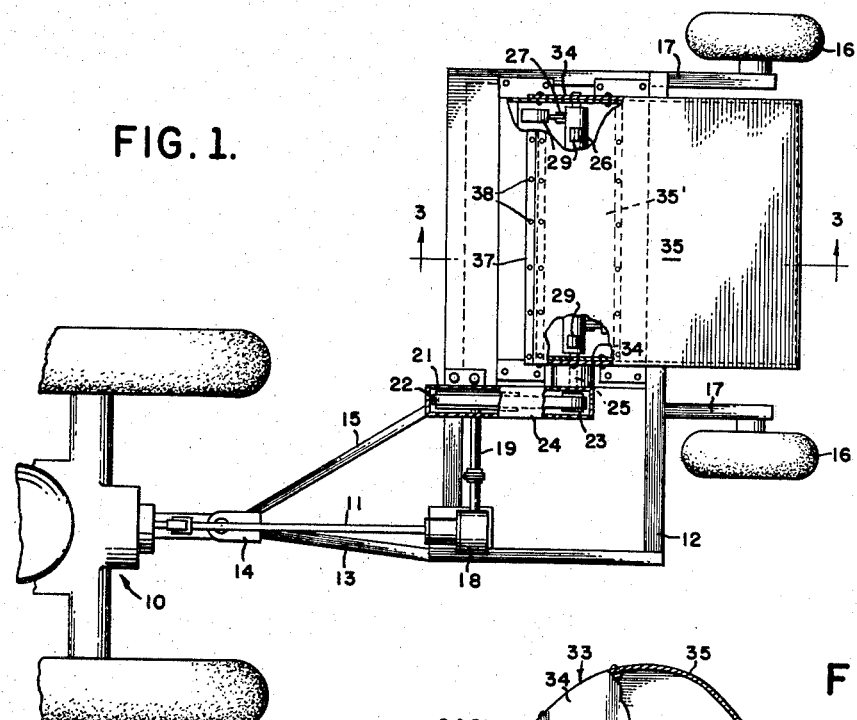
FIG. 1 is a fragmentary top plan view of a flail chopper assembly constructed in accordance with the present invention, a portion thereof being broken away to disclose details.
Figure 2:
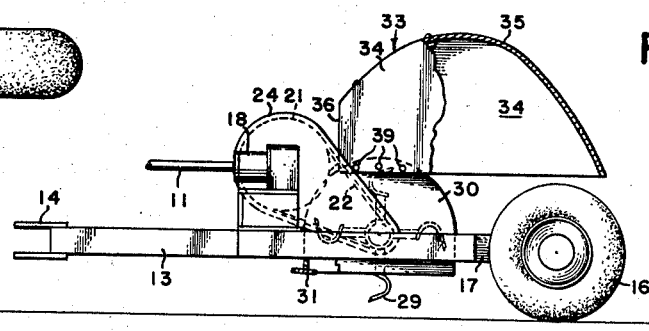
FIG. 2 is a side elevational view of the assembly of FIG. 1, a portion thereof being broken away to disclose details.

Referring now in greater detail to the drawings, there is shown in FIG. 1 a tractor or other towing vehicle 10 having a power takeoff 11 which is operatively connected to the flail chopper of the present invention. This assembly includes a rectangular frame 12 having a forwardly extending connector arm 13. A hitch 14, secured to the free terminal of arm 13, is detachably engaged with tractor 10. A brace member is indicated at 15. A pair of wheels 16 is connected to the rear portion of frame 12 by wheel supports 17.

Figure 3:
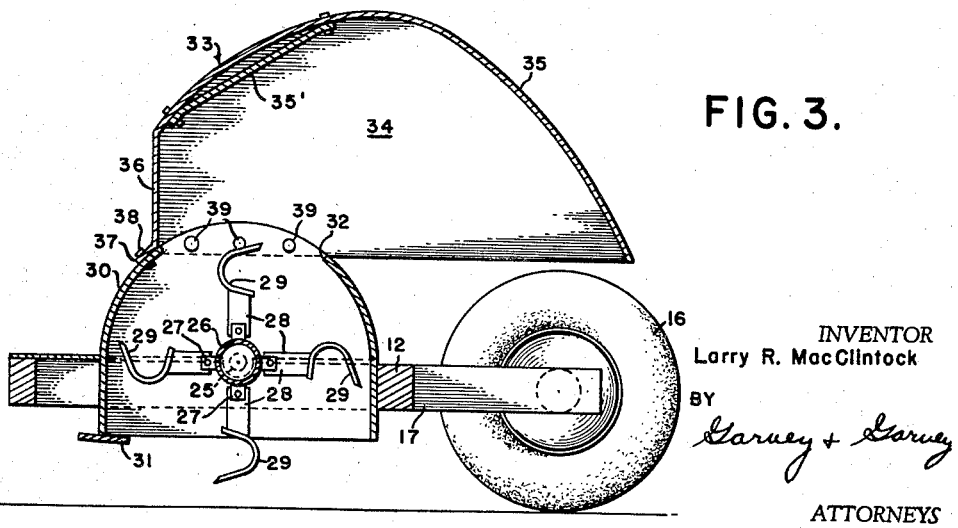
FIG. 3 is an enlarged sectional view taken along the line 3—3 of FIG. 1 looking in the direction of the arrows.

Power takeoff 11 of towing vehicle 10 is operatively connected to a gear box 18 for actuating a driven shaft 19 extending inwardly of frame 12. A pulley 21, on which is mounted a drive belt 22, is operatively connected to driven shaft 19, the belt 22 being trained over a second pulley 23 of smaller size than pulley 21. Pulleys 21 and 23 and belt 22 are enclosed in a housing 24. Pulley 23 actuates a shaft 25 which extends from a point adjacent one terminal of frame 12 to a point adjacent the other terminal thereof and is journaled in any suitable manner. A cylindrical member 26 is fixed to, and rotatable with, shaft 25, which cylindrical member is of substantial length and provided with a plurality of spaced ears 27 at 90° intervals along the periphery of the cylindrical member. As shown in FIG. 3, hammers 28 are bolted to the spaced ears 27, the outer terminals of said hammers being provided with arcuate cutting members 29. A semi-circular casing 30 is positioned over and is co-extensive with, the cutting members, said casing being secured to the frame in any suitable manner. A transverse cutting bar 31 is secured to the lower forward extremity of casing 30 for coaction with arcuate cutting members 29, in chopping a crop after it has been initially cut by the cutting members. The upper portion of casing 30 is open, as indicated at 32, through substantially the entire width of the casing, for communication with the interior of a hood, generally designated 33, forming a salient portion of the present invention.

Hood 33 is of generally semi-circular or dome shape in cross section and includes spaced side members 34 and a top or roof 35 of arcuate conformation which connects the side members and extends from the rearmost terminal of the hood to the front thereof where it is flattened to form a front wall 36. A front flange 37 issues from front wall 36, which flange is secured to casing 30 by suitable means 38. Additional securing means 38 are provided for fixing side members 34 of the hood to the casing.

Hood 33 is coextensive with the width of the cutting unit and with top openings 32 of casing 30. The hood is preferably made of 5-pound metal plate or material of comparable strength to withstand the force of stones and other foreign objects thrown into the hood by the cutting unit. In order to positively prevent these foreign objects from piercing top 35 and thereby decreasing the efficiency of the vacuum within the hood, a flat reinforcing plate 35' is mounted on the interior top wall of the hood. As shown in FIG. 3, plate 35' is preferably bolted or detachably secured in any other suitable manner to top 35 to permit ready removal and replacement. Plate 35' is preferably made of 5-pound plate from one to one and a half feet wide and coextensive with the width of the hood.

Plate 35' is positioned approximately eighteen inches from front wall 36 in order to receive the full impact of foreign objects catapulted into the hood by the cutting unit.

In use of the flail chopper assembly, the cutting unit is preferably operated at 1500 to 1700 r.p.m. by power takeoff 11 of the towing vehicle 10. The flail height of the cutter is preferably two inches and the forward ground speed of the assembly is 5 to 6 miles per hour. As the assembly moves over the field in which the crop is located it is cut by members 29 following which it is catapulted through opening 32 of casing 30 into hood 33. The flailing action of cutting members 29 creates a vacuum within the hood which picks up the crop after cutting and draws it into the hood where it strikes the top 35 thereof with such force that water is expressed from the crop under the impact. This liquid is partially evaporated by air turbulence within the hood. After the crop strikes the hood it is channeled rearwardly thereof by the arcuate contour of top 35 and is deposited on the ground where the sun and atmosphere complete the curing process in a short period of time.

For a tedding operation optimum results are obtained with the present assembly by reducing the speed of rotation of the cutting unit to 1000 r.p.m., raising the height of the cutting unit in conventional manner to a height of eight to twelve inches off the ground and increasing the forward speed of the assembly to 10 to 14 miles per hour, if desired.

In FIGS. 4–9 there is illustrated the manner of adapting the assembly of the present invention for windrowing the cut crop. For this purpose, there is mounted under the hood a pair of arcuate stationary baffles 40 of irregular shape each having an upper flange 41. It will be noted from FIG. 5 that stationary baffles 40 are spaced apart and positioned within hood 33 in such a manner that they extend from a point intermediate the length thereof to a point adjacent the aft extremity, with flange 41 in flush engagement with the undersurface of hood top 35. The lowermost extremity of each baffle 40 is in spaced relation to the lower terminal of hood 33. Securement of baffles 40 in position is effected by bolt and wing nut means 42 extending through top 35 and side members 34 of the hood. It will be noted from FIG. 4 that the arcuate conformation of stationary baffles 40 seals off the rear corners of the hood, leaving a narrower passageway through which the crop may pass, in order to effect windrowing.

In order to adjust the width of the windrows, there is attached to each stationary baffle, at its lowermost aft edge, a swinging baffle 43 hingedly connected to the former by a strap hinge 44 secured by means 45. In order to effect adjustment of swinging baffles 43 to narrow the width of the windrows, top 35 of hood 33 is provided with arcuate slots 47 each of which extends through approximately a 90° angle. Adjustment of each swinging baffle to the desired position is effected by means of a bolt 48 which is secured in any suitable manner to the aft end of baffle 43 and extends through arcuate slot 47, where it is held in place by a wing nut or the like 49. With baffles 40 and 43 positioned within hood 33, as shown in FIGS. 4, 5 and 6 of the drawing, the cut crop, which is thrown against the top of the hood under the force of the vacuum created therein, is then channeled rearwardly by the hood and also is channeled inwardly by the stationary baffles to the aft edge of the hood, where it is deposited on the ground in a windrow of a width corresponding to the distance between baffles. If it is desired for any reason to reduce the width of the windrows, baffles 43 are swung inwardly in the manner illustrated in FIGS. 6 and 9 until the distance between the proximate terminals of the baffles corresponds to the desired windrow width.

Wing nuts 49 are then tightened to secure the baffles in position.

With the assembly of the present invention, simple and compact means are provided for cutting and curing hay or like crops in an expeditious manner while at the same time affording an adaptable unit capable of distributing a crop in a quick drying swath or in windrows of any desired width.

While I have here shown and described a preferred embodiment of this invention, it is nevertheless to be understood that various changes may be made therein without departing from the spirit and scope of the appended claims.

What is claimed is:

1. Apparatus for cutting and conditioning a crop, including a cutting unit comprising an elongated rotatable support bar, cutting members connected at intervals to said support bar, means for rotating said support bar and cutting members, a casing positioned over said cutting unit, said casing having an elongated opening at its upper limit, and a hood superimposed on said casing at the locus of the opening, the hood being of substantially dome-shape, and including side members and an arcuate top member, the highest point of said hood being superjacent the aft extent of the cutting unit's path of rotation, thereby forming a void of substantial size in which a vacuum is built up by the rotation of said cutting unit, the crop being directed upwardly and rearwardly after being cut, by the force of the cutting members and the vacuum created in the void between the cutting members and the top of the hood.

2. Apparatus for cutting and conditioning a crop including a cutting unit, means for rotating said cutting unit, housing means positioned over said cutting unit, said housing means including a substantially arcuate lower portion, said lower portion lying adjacent the path of rotation of said cutting unit, the housing means including an upper portion of substantially dome-shape including side members and an arcuate top member, said top member being remote from the path of rotation of said cutting unit, thereby forming a void of substantial size within said upper portion in which a vacuum is built up by the rotation of said cutting unit, the crop being directed upwardly and rearwardly, after being cut, by the force of the cutting unit and the vacuum created in the void between the cutting unit and the top of the upper portion.

3. The apparatus of claim 2 with the addition of a reinforcing plate mounted on the interior of said upper portion of the housing means, to receive the full impact of the cut crop and foreign objects catapulted into the upper portion by said cutting unit.

4. The apparatus of claim 2, with the addition of arcuate stationary baffles fixed within said upper portion of the housing means in spaced relationship, the baffles extending inwardly and rearwardly from a point intermediate the length of the hood to a point adjacent the aft extremity thereof, for windrowing the crop.

5. The apparatus of claim 4, with the addition of swinging baffles, hingedly connected to the lower terminals of said stationary baffles, said swinging baffles being movable inwardly, and means for holding said swinging baffles in predetermined position, for determining the width of the windrows.

References Cited by the Examiner

UNITED STATES PATENTS

| | | | |
|---|---|---|---|
| 2,911,780 | 11/59 | Brady | 56—1 |
| 2,918,774 | 12/59 | McCarty | 56—1 |
| 2,999,346 | 9/61 | Mathews | 56—24 |
| 3,035,393 | 5/62 | Mathews | 56—505 |

T. GRAHAM CRAVER, *Primary Examiner.*

ANTONIO F. GUIDA, ARNOLD RUEGG, *Examiners.*